United States Patent
Yamamoto

(10) Patent No.: US 9,275,381 B2
(45) Date of Patent: Mar. 1, 2016

(54) CHARGING AND BILLING SYSTEM AND BILLING DEVICE

(75) Inventor: Sei-ichiro Yamamoto, Tokyo (JP)

(73) Assignee: SUNTORY HOLDINGS LIMITED, Osaka-shi, Osaka (JP)

(*) Notice: Subject to any disclaimer, the term of this patent is extended or adjusted under 35 U.S.C. 154(b) by 0 days.

(21) Appl. No.: 14/123,774

(22) PCT Filed: Jun. 9, 2011

(86) PCT No.: PCT/JP2011/063238
§ 371 (c)(1),
(2), (4) Date: Dec. 4, 2013

(87) PCT Pub. No.: WO2012/169039
PCT Pub. Date: Dec. 13, 2012

(65) Prior Publication Data
US 2014/0101041 A1    Apr. 10, 2014

(51) Int. Cl.
*G06Q 40/00*    (2012.01)
*G06Q 20/14*    (2012.01)
(Continued)

(52) U.S. Cl.
CPC ............ *G06Q 20/145* (2013.01); *G07F 15/005* (2013.01); *G06Q 30/04* (2013.01); *G06Q 50/06* (2013.01); *Y02T 90/12* (2013.01); *Y02T 90/128* (2013.01)

(58) Field of Classification Search
CPC ........................................................ G06Q 30/04
USPC ........................................................ 705/40
See application file for complete search history.

(56) References Cited

U.S. PATENT DOCUMENTS 5,451,755 A    9/1995    Duval et al.
6,081,205 A    6/2000    Williams
(Continued)

FOREIGN PATENT DOCUMENTS

DE    10 2009 049 082 A1    4/2011
JP    H06-231361 A    8/1994
(Continued)

OTHER PUBLICATIONS

International Search Report & Written Opinion dated Jul. 26, 2011 mailed for PCT/JP2011/063238 filed Jun. 9, 2011.
(Continued)

*Primary Examiner* — Edward Chang
(74) *Attorney, Agent, or Firm* — Drinker Biddle & Reath LLP

(57) ABSTRACT

A charging and billing system, which can be installed in a space-saving manner and at low cost when installed in a parking lot where multiple electric vehicles park, is provided. The charging and billing system has: multiple charging devices that performed charging by supplying electricity; a vending machine, which is separate to the charging devices, and which performs billing according to the amount of electricity supplied during charging; and a transmission line that connects the charging devices to the vending machine so as to enable information to the transmitted. The vending machine has: a touch panel that displays on a fee on a screen according to the amount of electricity supplied during charging; a settlement unit for settling the fee according to the amount of electricity supplied during charging; a fee calculation unit that calculates the fee corresponding to the amount of electricity supplied by a charging device; and a charging initiation unit that causes the charging device to begin charging, by transmitting initiation information for causing the charging device to begin charging to the charging device via the transmission line.

6 Claims, 4 Drawing Sheets

(51) Int. Cl.
*G07F 15/00* (2006.01)
*G06Q 50/06* (2012.01)
*G06Q 30/04* (2012.01)

(56) References Cited

U.S. PATENT DOCUMENTS

| | | |
|---|---|---|
| 2009/0144150 A1* | 6/2009 | Sakakibara et al. ............ 705/14 |
| 2009/0287578 A1 | 11/2009 | Paluszek et al. |
| 2010/0161518 A1* | 6/2010 | Littrell .......................... 705/412 |
| 2010/0191585 A1 | 7/2010 | Smith |
| 2011/0208953 A1* | 8/2011 | Solomon et al. ................... 713/2 |

FOREIGN PATENT DOCUMENTS

| | | |
|---|---|---|
| JP | H06-237504 A | 8/1994 |
| JP | 2001-312772 A | 11/2001 |
| JP | 2007-193732 A | 8/2007 |
| JP | 2010-154635 A | 7/2010 |
| WO | WO 2011/042322 A1 | 4/2011 |

OTHER PUBLICATIONS

Extended European Search Report dated Mar. 12, 2015 mailed for European Patent Application No. 11 86 7471.2 (6 pages).

* cited by examiner

CHARGING AND BILLING SYSTEM AND BILLING DEVICE

CROSS REFERENCE TO RELATED APPLICATIONS

This application is the National Stage of International Application No. PCT/JP2011/063238, filed Jun. 9, 2011, which is herein incorporated by reference in its entirety.

TECHNICAL FIELD

The present invention relates to a charging and billing system and a billing device that performs billing according to an amount of electric power supplied upon charging.

BACKGROUND ART

Patent Document 1 discloses an electricity vending machine that performs charging by supplying electric power to a load (subject) such as a car-mounted battery of an electric vehicle. This electricity vending machine performs billing according to the amount of electric power supplied upon charging. Specifically, the electricity vending machine calculates an amount of electric power that corresponds to a payment, and supplies the calculated amount of electric power to the load.

RELATED ART

Patent Document
[Patent Document 1] Japanese Unexamined Patent Application Publication No. Heisei 6-231361

SUMMARY OF THE INVENTION

Problem to be Solved by the Invention

However, if the electricity vending machine described in Patent Document 1 is to be installed in a parking lot that accommodates a plurality of electric vehicles, it has to be installed for each parking space, which creates the problem of increase in space and cost for installing the electricity vending machines.

An objective of the present invention is to provide a charging and billing system and a billing device that can be installed in a space-saving manner and at low cost when they are to be installed in a parking lot that accommodates a plurality of electric vehicles.

Means for Solving the Problem

In order to solve these problems, a first invention provides a charging and billing system that performs billing according to an amount of electric power supplied upon charging, the system comprising: a plurality of charging devices; a billing device; and a transmission path. The charging device performs charging by supplying electric power to a subject. The billing device is provided separately from the charging devices. The transmission path connects the plurality of charging devices and the billing device in a manner that allows transmission of information. Moreover, the billing device comprises a charging initiator, a bill calculating unit, a display unit and a payment unit. The charging initiator sends initiation information to the charging device for initiating charging via the transmission path, by which the charging device initiates charging the subject. The bill calculating unit calculates the bill corresponding to the amount of electric power that is to be supplied to the subject by the charging device. The display unit indicates the bill calculated by the bill calculating unit. The payment unit processes the payment of the bill calculated by the calculating unit.

Preferably, in the first invention, the billing device further comprises an acquisition unit for acquiring an amount of electric power that can be supplied to the subject, and the display unit indicates the amount of electric power acquired by the acquisition unit. In addition, preferably, the billing device further comprises an input unit for inputting operation from outside, and a setting unit for setting information of an amount of electric power to be supplied by the charging device based on the input into the input unit, in which case, the charging initiator sends the initiation information and the information of the amount of electric power to the charging device via the transmission path. The bill calculating unit preferably calculates bill corresponding to the amount of electric power that is to be supplied to the subject by the charging device based on the information of the amount of electric power set by the setting unit. Preferably, the billing device further comprises a charging time estimating unit for estimating time that takes for charging the subject based on the information of the amount of electric power set by the setting unit.

A second invention provides a billing device employed in the charging and billing system, for performing billing according to an amount of electric power supplied upon charging, the billing device comprising: a charging initiator; a bill calculating unit; a display unit; and a payment unit. The charging initiator sends initiation information to the charging device to initiate charging via the transmission path so that the charging device initiates charging the subject. The bill calculating unit calculates bill corresponding to the amount of electric power that is to be supplied to the subject by the charging device. The display unit indicates the bill calculated by the bill calculating unit. The payment unit processes the payment of the bill calculated by the bill calculating unit.

Here, in the first and second inventions, the billing device is preferably a beverage vending machine.

EFFECT OF THE INVENTION

According to the present invention, the plurality of charging devices that perform charging by supplying electric power to a subject are provided separately from the billing device that performs billing according to an amount of electric power supplied upon charging. At the billing device, the charging initiator makes the charging device to initiate charging the subject, the bill calculating unit calculates bill corresponding to the amount of electric power that is to be supplied to the subject by the charging device, and the payment unit processes the payment of the bill. Therefore, according to the present invention, since only a charging device needs to be installed for each parking space in a parking lot that accommodates a plurality of electric vehicles and the billing device can be installed away from the parking spaces, they can be installed in a space-saving manner and at low cost.

EMBODIMENTS FOR CARRYING OUT THE INVENTION

Figure 1:
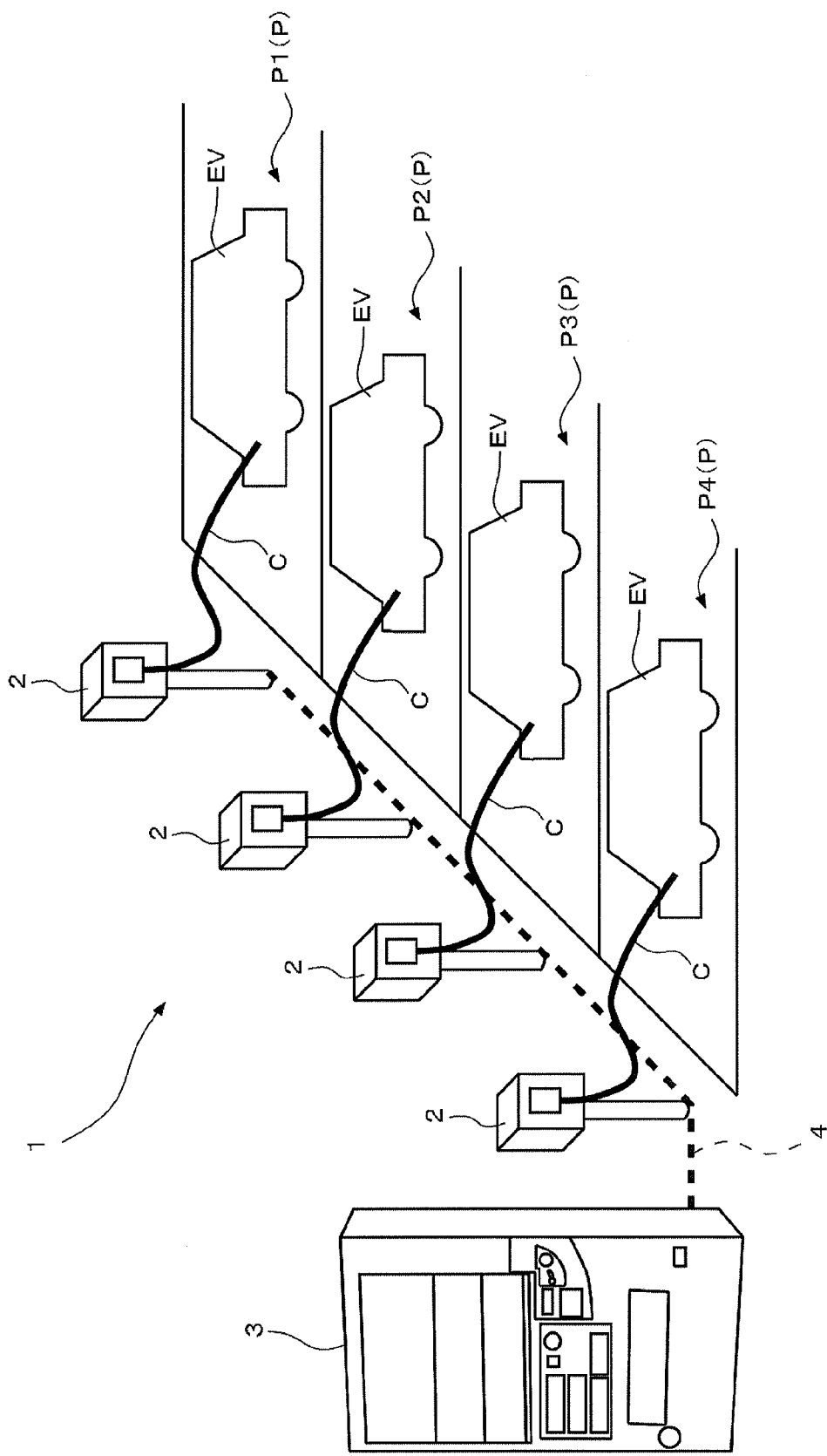
FIG. 1 An overall schematic view of a charging and billing system.

FIG. 1 is an overall schematic view of a charging and billing system according to the present embodiment. The charging and billing system 1 comprises a plurality of charging devices 2, a beverage vending machine 3 as a billing device and a transmission path 4. The charging device 2 is installed next to each of parking spaces P1-P4 in a parking lot P that accommodates a plurality electric vehicles EV. This charging device 2 performs charging by supplying electric power to a car-mounted battery (subject) of an electric vehicle EV. The vending machine 3 performs billing according to the amount of electric power supplied upon charging. This vending machine 3 is provided separately from the charging devices 2. The transmission path 4 connects the charging devices 2 and the vending machine 3 in a manner that allows transmission of information.

Figure 2:
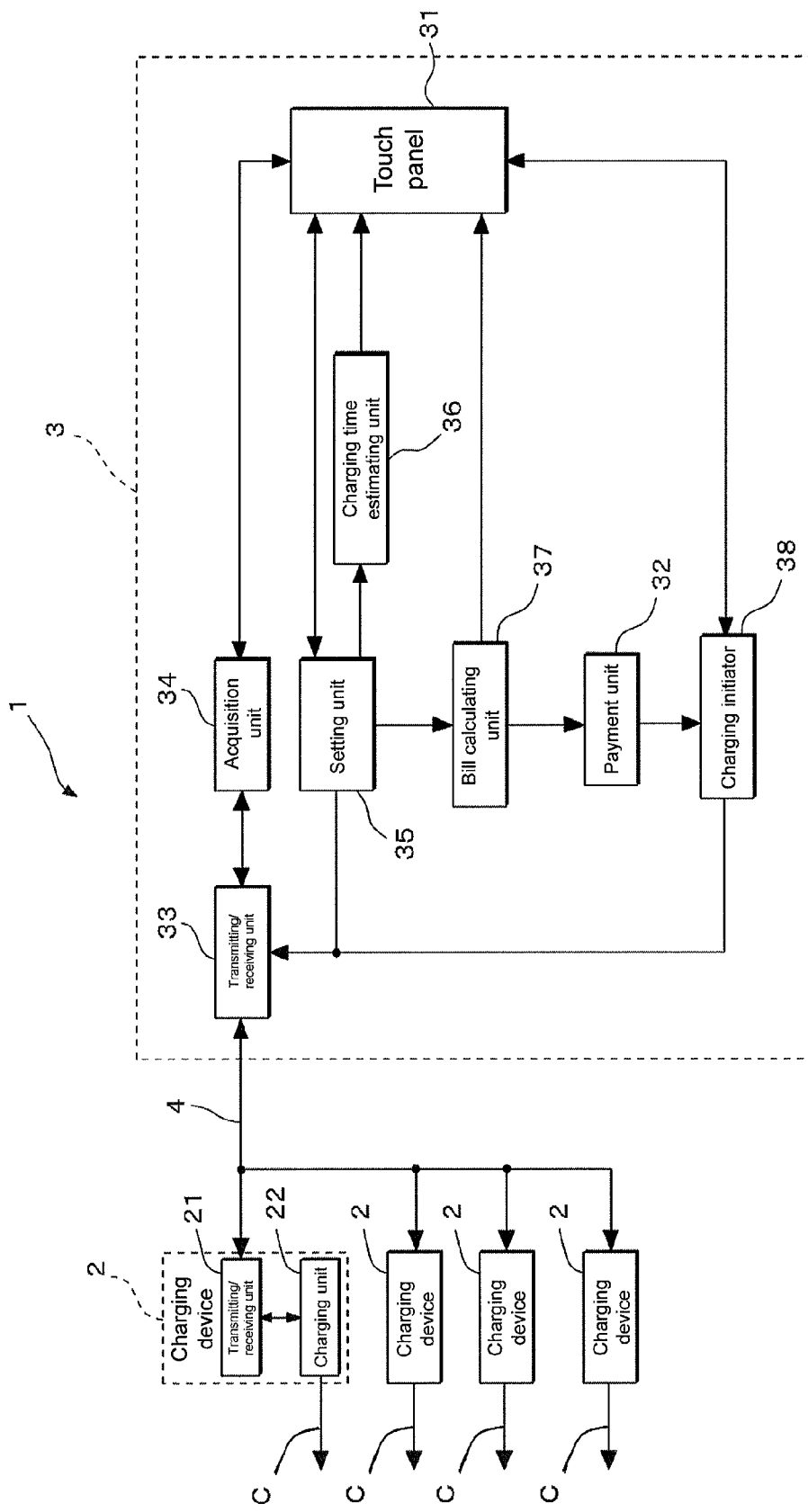
FIG. 2 A block diagram of the charging and billing system.

FIG. 2 is a block diagram of the charging and billing system 1. The charging device 2 comprises a CPU (Central Processing Unit) that performs information processing following a predetermined program, a memory for storing information including this program, and the like. Each of the charging devices 2 has unique identification information. This charging device 2 comprises a transmitting/receiving unit 21 and a charging unit 22. The transmitting/receiving unit 21 transmits information to the vending machine 3 via the transmission path 4 by a means of a serial transmission scheme. The charging unit 22 is connected to an electric vehicle EV via a cable C (see FIG. 1) so as to supply electric power to a car-mounted battery of the electric vehicle EV. Moreover, the charging unit 22 reads out information from the electric vehicle EV via the cable C so as to acquire the battery capacity of the car-mounted battery and the remaining battery level of the car-mounted battery. Then, the charging unit 22 calculates an amount of electric power that can be supplied to the car-mounted battery (hereinafter, referred to as a maximum amount of electric power to be supplied) by subtracting the remaining battery level from the battery capacity.

Figure 3:
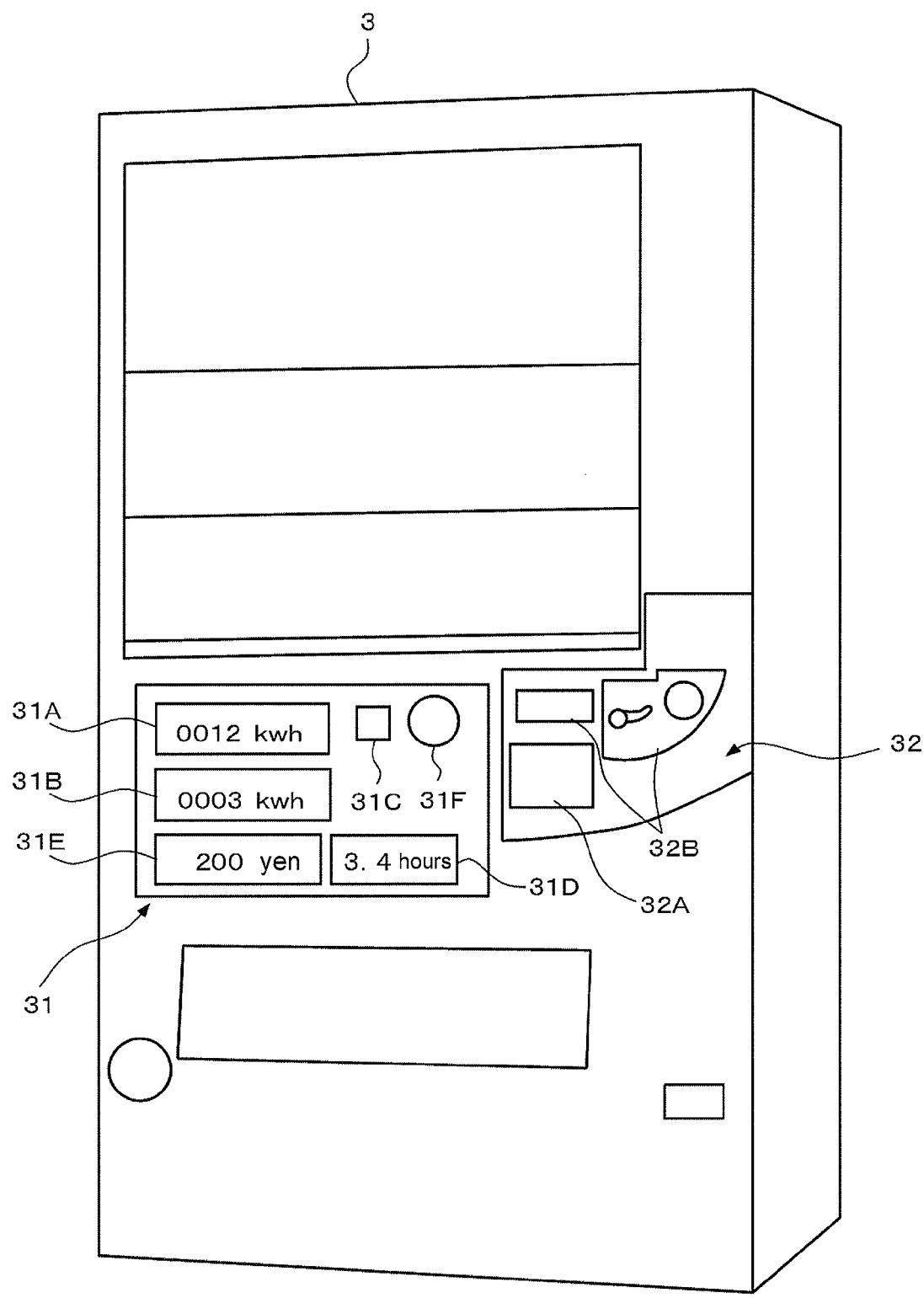
FIG. 3 A schematic view showing the appearance of the vending machine.

FIG. 3 is a schematic view showing the appearance of the vending machine 3. The vending machine 3 comprises a CPU, a memory and the like. This vending machine 3 comprises a touch panel 31 and a payment unit 32. The touch panel 31 serves as a display unit for indicating bill corresponding to an amount of electric power supplied upon charging and the like on a screen, and also serves as an input unit for inputting operation from outside by displaying buttons or the like to be operated on the screen. Although the touch panel 31 is employed as a display unit and an input unit in this embodiment, the display unit and the input unit may be provided as separate devices. Specifically, for example, a device such as a liquid crystal panel may be used as a display unit while a device such as mechanical buttons may be used as an input unit. The payment unit 32 comprises a reader 32A for electronic money and slots 32B for paper money and coins so as to accept payment of the bill corresponding to the amount of electric power supplied upon charging. Moreover, a device such as a reader for a credit card may also be employed as a payment unit. In fact, the payment unit may be any device as long as it can process payment of the bill. Furthermore, since beverage vending machines that are already distributed to the market have such functions of the payment unit, a beverage vending machine can be employed as a billing device to reduce the production cost of the billing device.

As can be appreciated from FIG. 2, the vending machine 3 comprises a transmitting/receiving unit 33, an acquisition unit 34, a setting unit 35, a charging time estimating unit 36, a bill calculating unit 37 and a charging initiator 38. The transmitting/receiving unit 33 transmits information to the charging device 2 via the transmission path 4 by a means of a serial transmission scheme. Once this transmitting/receiving unit 33 is connected to the transmitting/receiving unit 21 of the charging device 2 via the transmission path 4, it reads out the identification information of each of the charging devices 2. Thus, the vending machine 3 is capable of identifying each of the charging devices 2 and capable of transmitting and receiving information to and from each of the charging devices 2. For example, USB (Universal Serial Bus), LAN (Local Area Network) or the like can be employed as a standard for such a serial transmission scheme.

The acquisition unit 34 acquires the maximum amount of electric power to be supplied from the charging unit 22 of the charging device 2, and indicates this maximum amount of electric power to be supplied on a display area 31A of the touch panel 31 (see FIG. 3). The setting unit 35 sets information of an amount of electric power to be supplied by the charging device 2 based on the input into the touch panel 31.

Specifically, the setting unit 35 indicates the information of the amount of electric power on a display area 31B of the touch panel 31 (see FIG. 3). Furthermore, the setting unit 35 displays a sum button 31C on the touch panel 31 for summing a predetermined amount of electric power to the information of the amount of electric power (see FIG. 3). The information of the amount of electric power is stored in the memory with an initial value of 0. The charging time estimating unit 36 estimates time that takes for charging a car-mounted battery of an electric vehicle EV based on the information of the amount of electric power set by the setting unit 35 and indicates this estimated time on a display area 31D of the touch panel 31 (see FIG. 3). The bill calculating unit 37 calculates bill corresponding to the amount of electric power to be supplied to the car-mounted battery of electric vehicles EV by the charging device 2 based on the information of the amount of electric power set by the setting unit 35, and indicates this bill on a display area 31E of the touch panel 31 (see FIG. 3). The charging initiator 38 displays a charging button 31F on the touch panel 31 for making the charging device 2 to initiate charging (see FIG. 3). After the payment of the bill calculated by the bill calculating unit 37 is processed by the payment unit 32 and once the charging button 31F is pressed, this charging initiator 38 transmits the initiation information for making the charging device 2 to initiate charging and the information of the amount of electric power set by the setting unit 35 to the charging device 2 via the transmission path 4. As a result, the charging initiator 38 makes the charging device 2 to initiate charging the car-mounted battery of the electric vehicle EV.

Figure 4:
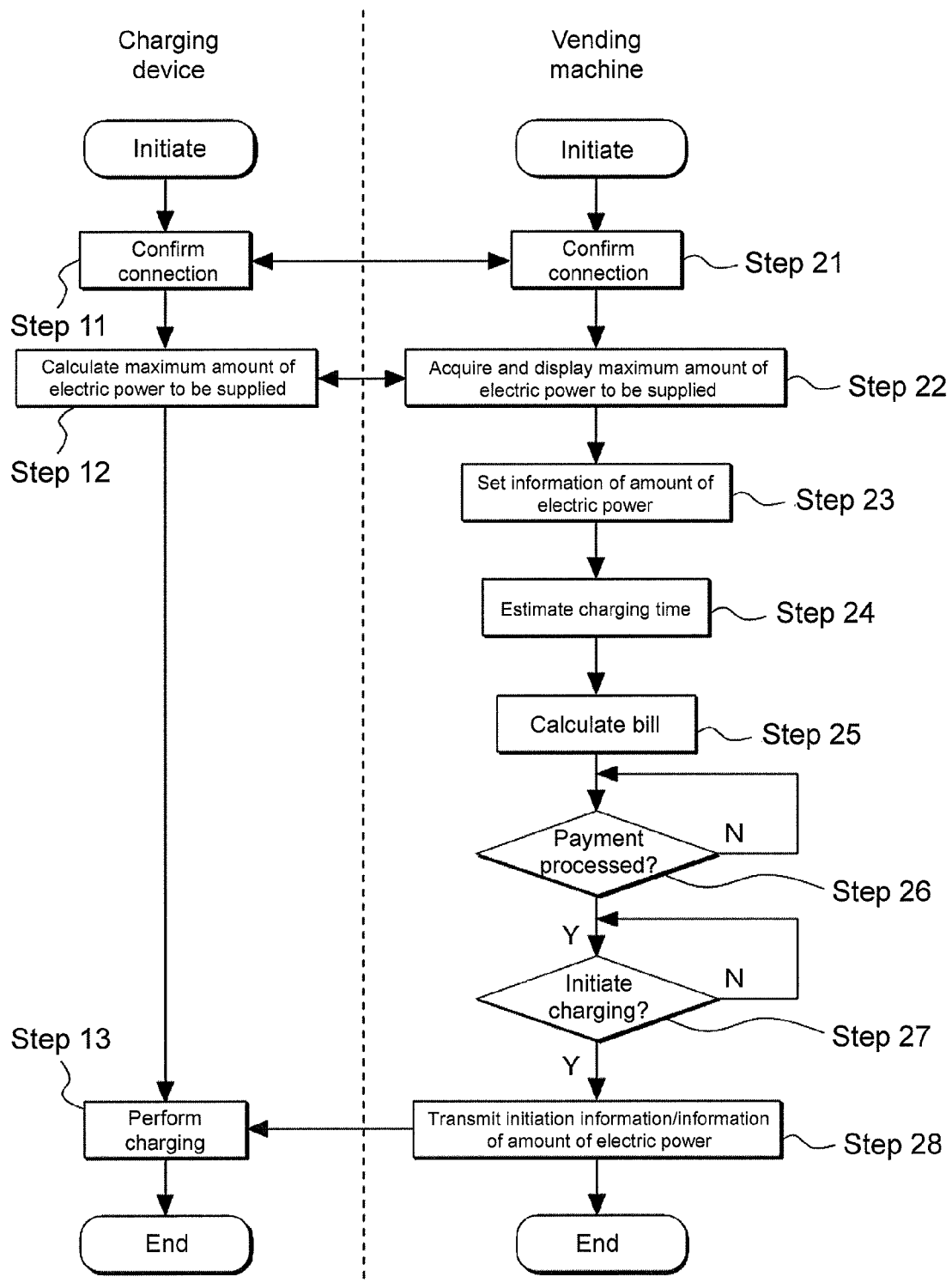
FIG. 4 A flowchart of charging and billing by the charging and billing system.

FIG. 4 is a flowchart of charging and billing by the charging and billing system 1. Once the charging device 2 is connected to an electric vehicle EV via the cable C, the charging unit 22 confirms connection with the electric vehicle EV (Step 11). Then, the charging unit 22 calculates a maximum amount of electric power to be supplied (Step 12). In Step 11, once the connection between the charging device 2 and the electric vehicles EV is confirmed, information is transmitted and received between the charging device 2 and the vending machine 3, and the vending machine 3 confirms the connection between the charging device 2 and the electric vehicle EV (Step 21). In doing so, the vending machine 3 sets the information of the amount of electric power stored in the memory to 0.

In Step 12, once a maximum amount of electric power to be supplied is calculated by the charging unit 22, information is transmitted and received between the charging device 2 and the vending machine 3, and the acquisition unit 34 of the vending machine 3 acquires the maximum amount of electric power to be supplied from the charging unit 22 and displays the result on the touch panel 31 (Step 22).

When the sum button 31C is pressed by external operation, the setting unit 35 sums a predetermined amount of electric power (for example, 1 kW) to the information of the amount of electric power, resets the information of the amount of electric power, and indicates this reset information of the amount of electric power on the touch panel 31 (Step 23). Here, resetting the information of the amount of electric power is limited not to exceed the maximum amount of electric power to be supplied. In other words, the maximum value for the information of the amount of electric power equals the maximum amount of electric power to be supplied.

The charging time estimating unit 36 estimates time that takes to charge the car-mounted battery of the electric vehicle EV by multiplying the information of the amount of electric power set by the setting unit 35 by a unit supply amount, i.e., an estimated amount of electric power to be supplied by the charging device 2 per unit time, and indicates this estimated time on the touch panel 31 (Step 24). Here, the unit supply amount is determined and stored in the memory in advance. Alternatively, when a unit supply amount is stored in each of the charging devices 2, the charging time estimating unit 36 may read out this unit supply amount from the charging device 2 and multiply it by the information of the amount of electric power set by the setting unit 35 to estimate time that takes to charge the car-mounted battery of the electric vehicle EV. At any rate, the charging time estimating unit may estimate time that takes to charge a subject based on information of an amount of electric power set by the setting unit.

The bill calculating unit 37 calculates bill corresponding to the amount of electric power to be supplied to the car-mounted battery of the electric vehicles EV by the charging device 2 by multiplying the information of the amount of electric power set by the setting unit 35 by a unit price, i.e., bill per unit amount of electric power, and indicates this bill on the touch panel 31 (Step 25). Here, the unit price is determined and stored in the memory in advance. Alternatively, when the amount of electric power to be supplied to the car-mounted battery of the electric vehicle EV by the charging device 2 can be acquired from the charging device 2, the bill calculating unit 37 may read out this amount of electric power from the charging device 2 and multiply it by the unit price to calculate the bill corresponding to the amount of electric power to be supplied to the car-mounted battery of the electric vehicle EV by the charging device 2. Specifically, the bill calculating unit may calculate bill corresponding to the amount of electric power to be supplied to the subject by the charging device.

The payment unit 32 judges whether or not payment of the bill calculated by the bill calculating unit 37 has been processed (Step 26). While the payment unit 32 judges whether or not the bill has been paid, the charging initiator 38 disables the charging button 31F. Once the payment unit 32 judges that the bill has been paid, this charging initiator 38 enables the charging button 31F and makes the charging button 31F to blink. Then, the charging initiator 38 judges whether or not the charging button 31F has been pressed (Step 27). When the charging initiator 38 judges that the charging button 31F has been pressed, it transmits the initiation information and the information of the amount of electric power to the charging device 2 via the transmission path 4, thereby making the charging device 2 to initiate charging the car-mounted battery of the electric vehicle EV (Step 28).

The initiation information and the information of the amount of electric power transmitted by the charging initiator 38 in Step 28 is received by the charging device 2.

Then, the charging unit 22 performs charging by supplying an amount of electric power based on the information of the amount of electric power to the car-mounted battery of the electric vehicle EV (Step 13).

Thus, according to the present embodiment, the plurality of charging devices 2 that perform charging by supplying electric power to car-mounted batteries of electric vehicles EV are provided separately from the vending machine 3 that performs billing according to an amount of electric power supplied upon the charging. At the vending machine 3, the charging initiator 38 makes the charging device 2 to charge the car-mounted battery of the electric vehicle EV, the bill calculating unit 37 calculates bill corresponding to the amount of electric power to be supplied to the car-mounted battery of the electric vehicle EV by the charging device 2, and the payment unit 32 processes payment of the bill. Therefore, according to the present embodiment, in a parking lot P that accommodates a plurality of electric vehicles EV, only the charging devices 2 need to be installed for the respective parking spaces P1-P4 while the vending machine 3 is installed at a place spaced apart from the parking spaces P1-P4. Therefore, they may be installed in a space-saving manner and at low cost.

In the above-described embodiment, the acquisition unit 34 acquires the maximum amount of electric power to be supplied from the charging unit 22 of the charging device 2. Alternatively, the acquisition unit may calculate the maximum amount of electric power to be supplied, for example, by acquiring the battery capacity of the car-mounted battery and the remaining battery level of the car-mounted battery from the charging device 2, and subtracting the remaining battery level from the battery capacity. At any rate, the acquisition unit needs to acquire the amount of electric power that can be supplied to the subject.

Moreover, according to the above-described embodiment, when the sum button 31C is pressed by external operation, the setting unit 35 sums the predetermined amount of electric power to the information of the amount of electric power and resets the information of the amount of electric power. Alternatively, for example, the setting unit may set the information of the amount of electric power upon input of a numerical value by external operation. At any rate, the setting unit needs to set the information of the amount of electric power based on the input into the input unit.

Additionally, according to the above-described embodiment, when the charging button 31F is pressed after the payment unit 32 has processed the payment of the bill calculated by the bill calculating unit 37, the charging initiator 38 makes the charging device 2 to initiate charging the car-mounted battery of the electric vehicle EV by transmitting the initiation information for making the charging device 2 to initiate charging and the information of the amount of electric power set by the setting unit 35 to the charging device 2 via the transmission path 4. Alternatively, the charging initiator may make the charging device to initiate charging by transmitting the initiation information to the charging device before payment is processed by the payment unit. In this case, the bill calculating unit can calculate bill corresponding to the amount of electric power supplied upon charging after the subject has been charged by the charging device and the payment unit can process payment of this bill.

Industrial Applicability

Accordingly, the present invention can be broadly applied to a charging and billing system and a billing device that performs billing according to an amount of electric power supplied upon charging.

Description of Reference Numerals
1 Charging and billing system
2 Charging device
3 Vending machine (billing device)
4 Transmission path
21 Transmitting/receiving unit
22 Charging unit
31 Touch panel (display unit, input unit)
31A Display area
31B Display area
31C Sum button
31D Display area
31E Display area
31F Charging button
32 Payment unit
32A Reader
32B Slots
33 Transmitting/receiving unit
34 Acquisition unit
35 Setting unit
36 Charging time estimating unit
37 Bill calculating unit
38 Charging initiator
C Cable
EV Electric vehicle
P Parking lot
P1-P4 Parking spaces

The invention claimed is:

1. A charging and billing system for performing billing according to an amount of electric power supplied upon charging, the system comprising:
 a plurality of charging devices each for performing charging by supplying electric power to a subject;
 a single billing device provided separately from the charging devices; and
 a transmission path for connecting the plurality of charging devices and the single billing device that processes payments for the plurality of charging devices in a manner that allows transmission of information,
 wherein the single billing device comprises:
 a charging initiator that makes the charging device to initiate charging the subject by transmitting initiation information for making the charging device to initiate charging to the charging device via the transmission path;
 a bill calculating unit for calculating bill corresponding to the amount of electric power to be supplied to the subject by the charging device;
 a display unit for indicating the bill calculated by the bill calculating unit;
 beverages to be vended by the single billing device; and
 a payment unit that processes payment of the bill calculated by the bill calculating unit and that processes payment for the beverages.

2. The charging and billing system according to claim 1 wherein:
 the billing device further comprises an acquisition unit for acquiring an amount of electric power that can be supplied to the subject; and
 the display unit indicates the amount of electric power acquired by the acquisition unit.

3. The charging and billing system according to claim 1, wherein:
 the billing device further comprises an input unit for inputting operation from outside, and a setting unit for setting information of an amount of electric power that is to be supplied by the charging device based on an input into the input unit; and
 the charging initiator transmits the initiation information and the information of the amount of electric power to the charging device via the transmission path.

4. The charging and billing system according to claim 3, wherein the bill calculating unit calculates bill corresponding to the amount of electric power that is to be supplied to the subject by the charging device based on the information of the amount of electric power set by the setting unit.

5. The charging and billing system according to claim 3, wherein the billing device further comprises a charging time estimating unit for estimating time that takes to charge the subject based on the information of the amount of electric power set by the setting unit.

6. A beverage vending machine employed in a charging and billing system, for performing billing according to an amount of electric power supplied upon charging, the beverage vending machine comprising:
 a charging initiator that makes a plurality of charging devices that performs charging by supplying electric power to a subject to initiate charging, by transmitting initiation information for making the plurality of charging devices to initiate charging to the plurality of charging devices;
 a bill calculating unit for calculating bill corresponding to an amount of electric power that is to be supplied to the subject by the plurality of charging devices;
 a display unit for indicating the bill calculated by the bill calculating unit;
 beverages to be vended by the beverage vending machine; and
 a payment unit that processes payment of the bill calculated by the bill calculating unit and that processes payment for the beverages.

* * * * *